W. E. CONNIFF.
MEANS FOR CONTROLLING THE ROTATION OF THE REELS OF FISHING RODS.
APPLICATION FILED APR. 2, 1910.
1,010,021.
Patented Nov. 28, 1911.
2 SHEETS—SHEET 1.
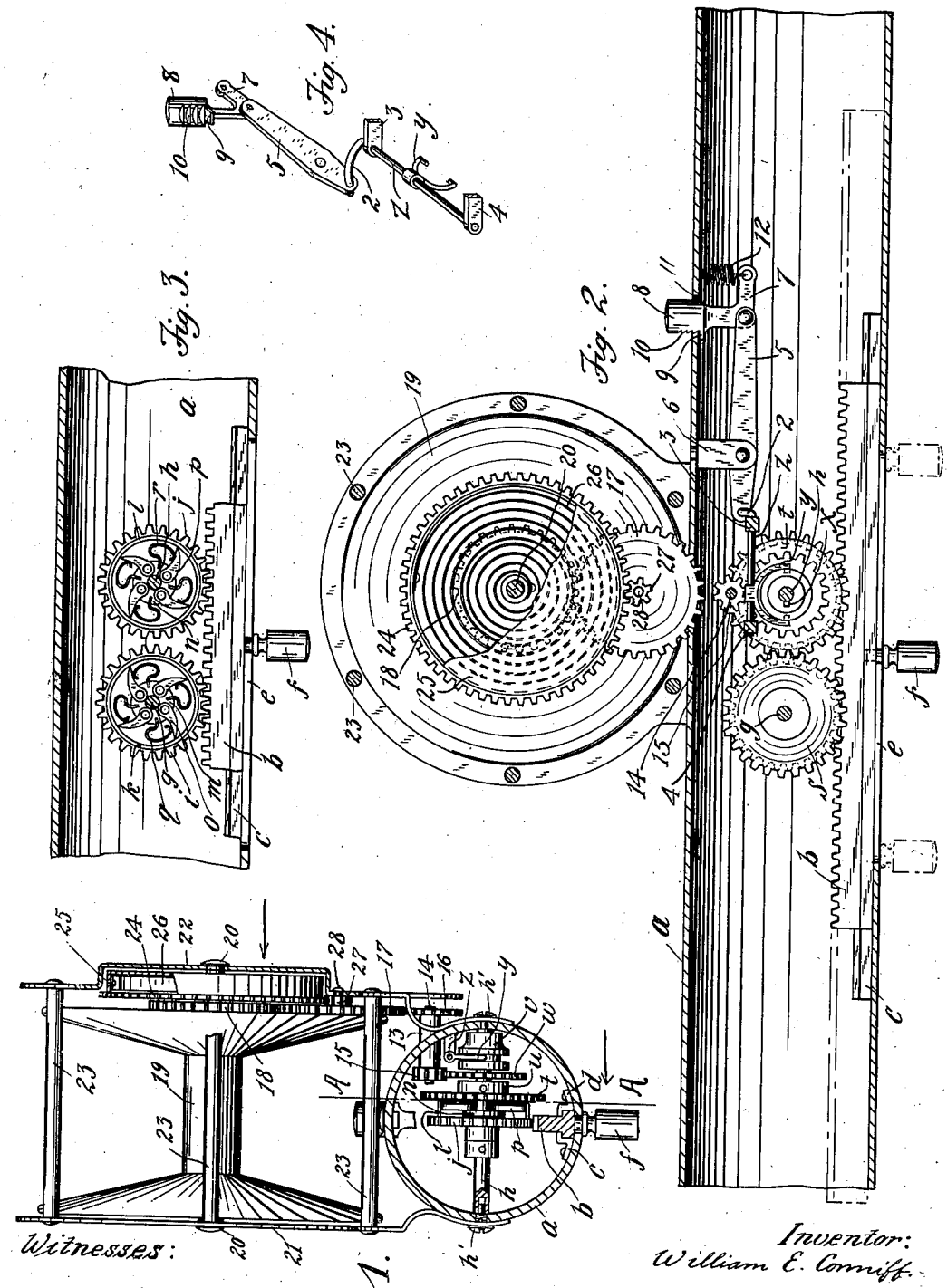
Witnesses:
Cecil Long
O O Martin
Inventor:
William E. Conniff
by T. J. Eisler
Atty.

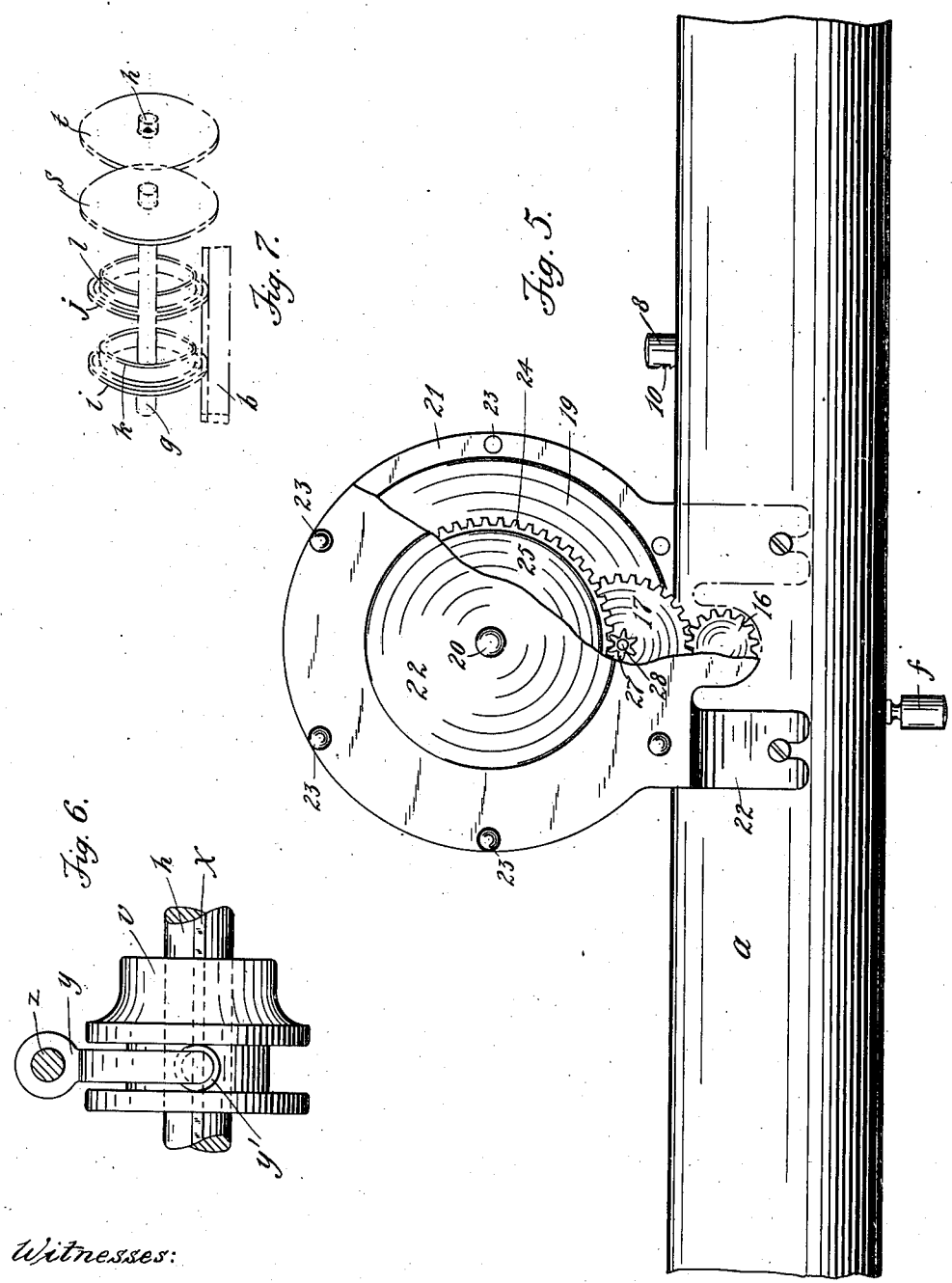

UNITED STATES PATENT OFFICE.

WILLIAM E. CONNIFF, OF PORTLAND, OREGON, ASSIGNOR OF ONE-HALF TO ROBERT F. ENGELHARDT, OF PORTLAND, OREGON.

MEANS FOR CONTROLLING THE ROTATION OF THE REELS OF FISHING-RODS.

1,010,021. Specification of Letters Patent. Patented Nov. 28, 1911.

Application filed April 2, 1910. Serial No. 553,151.

*To all whom it may concern:*

Be it known that I, WILLIAM E. CONNIFF, a citizen of the United States, residing at Portland, in the county of Multnomah and State of Oregon, have invented a new and useful Improvement in Means for Controlling the Rotation of Reels of Fishing-Rods, of which the following is a specification.

This invention has for its object to do away with the crank handle for winding the reel of a fishing rod, and to provide instead a winding means comprising a rack-bar-and-pinion, contained within the hollow handle of the rod, said rack-bar provided with a finger-piece, protruding through the exterior of the hollow handle, and the device being so arranged that by the reciprocable movement of the rack-bar the winding of the line on the reel is accomplished.

My invention further has for its purpose to provide automatic means for paying out the line from the reel, so as to let the fish, caught on the hook, run with the line, and, furthermore, to provide a clutch constituting the connecting element between the rack-bar-and-pinion and the reel, controlling the rotation of the latter, and being so arranged that it is operated by the depression and release of a finger-piece protruding through the hollow handle of the rod; the object of the last described feature being to be able to apply a brake to the reel, and thus make it harder for the fish to run away with the line.

My invention furthermore embodies the specific features hereinafter more specifically set forth.

In the drawings: Figure 1 is a cross-section of the hollow handle of a fishing rod, showing the reel mounted on the rod and the devices provided for causing and controlling the rotation of the reel; Fig. 2 is a longitudinal section of the hollow handle of my rod, showing the parts contained therein, looking in the direction pointed by the arrow in Fig. 1, also showing the reel and operating mechanism thereof mounted exterior of said handle; parts being broken away; Fig. 3 is a longitudinal section on a line A—A of Fig. 1, looking in the direction pointed by the arrow in Fig. 1; Fig. 4 is a perspective detail of construction of the clutch element by which the rotation of the reel is controlled; Fig. 5 shows a side elevation of my device, looking in the direction pointed by the arrow in Fig. 1; Fig. 6 is a detail of the clutch element; and Fig. 7 is a diagrammatic perspective of the arrangement of part of the gear transmission. All views, as evident, being drawn on an exaggerated scale.

The rod is provided with a tubular handle, $a$, in the hollow of which is mounted a rack-bar, $b$, reciprocable between two guide bars $c$, $d$, provided on the interior of the hollow handle. The casing of the hollow handle, underneath the rack-bar $b$, is provided with a longitudinal slot $e$, through which extends the pin or finger-piece $f$ on the rack-bar. Above the rack-bar $b$ are affixed two transverse rotatable shafts $g$, $h$; the ends of said shafts being provided with cavities in which to receive the pivot pins provided on the inner ends of the screws $h'$. On the shafts $g$, $h$ are loosely mounted gears $i$, $j$, meshing with the rack-bar $b$, but not with each other. To distinguish said gears $i$, $j$, I will term them primary gears. Each thereof is made with an annular rim-flange $k$, $l$, extending perpendicularly from one of their faces respectively, and located within such annular flanges $k$, $l$, rigidly mounted on the shafts $g$, $h$, are disks $m$, $n$, to the rims of which disks are pivoted radially disposed pawls $o$, $p$, held against the interior faces of the flanges $k$, $l$, by springs $q$, $r$.

As will be observed from Fig. 3, the pawls $o$, $p$ point in opposite directions, in order that when the rack-bar $b$ moves to the right, and the gears $i$, $j$ are correspondingly rotated, the pawls $o$ will engage with the annular flange $k$ of the gear $i$, causing it to become locked, and to rotate with the shaft $g$, while, during the same interval, the pawls $p$ will yield and permit the annular flange $l$ on the gear $j$ to slide over them without interlocking; the gear $j$ revolving for the time merely as an idler. When the rack-bar $b$ is moved in the opposite direction the described action is reversed, causing the shaft $h$ to become locked with and rotated by the gear $j$, and the gear $i$ to run as an idler.

Rigidly mounted on the shafts $g$, $h$ are two meshing gears $s$, $t$, which I shall term secondary gears, and as shown in Fig. 1, said secondary gears being spaced from the annular flanges $k$, $l$ of the primary gears $i$, $j$. Thus the reciprocation of the rack-bar $b$ causes the rotation of either of the shafts $g$, $h$, and as said shafts are operatively connected by the gears $s$, $t$, a more or less continuous rotation in the same direction is caused of the gear $t$.

On the shaft $h$ of the gear $t$ is mounted a clutch member $v$ longitudinally movable on a feather $x$; between said clutch member $v$ and the hub $u$ of the gear $t$ is loosely mounted, on the shaft $h$, a gear $w$, which I shall term transmitting gear. The clutch member $v$ is connected by a spanner $y$ to the shank $z$ of a rotary bell crank 2, said shank $z$ journaling in brackets 3, 4, provided on the interior of the hollow handle $a$. The bell crank 2 is operated by a lever 5, pivotally suspended from a hanger 6, provided in the hollow handle $a$. To the opposite end of the lever 5 is pivotally connected a bell crank 7, provided with a finger-piece 8, extending through an aperture 11 in the hollow handle $a$; the upward movement of said finger-piece 8 being limited by a flange 9. A coil-spring 12 is arranged to hold the finger-piece 8 in its normal elevated position. By depressing the finger-piece 8 the clutch member $y$ is caused to be moved longitudinally on the shaft $h$, forcing the gear $w$ into contact with the hub of the gear $t$, and causing the gear $w$ to rotate with said gear $t$. The frictional bearing of the transmitting gear $w$ on the gears $t$ depends upon the pressure exerted on the finger-piece 8; and thus if such pressure be light, the transmitting gear $w$ may be permitted some slip on the gear $t$, so as to only partially rotate therewith; and the degree of such rotation may, in consequence, be controlled as desired.

A shaft 14 journals in journal bearing 13, provided in the wall of the casing of the hollow handle $a$, and on the ends of said shaft 14 are rigidly mounted pinions 15, 16, the pinion 15 meshing with transmitting gear $w$ and the pinion 16 meshing with, and transmitting motion through, an intermediate gear 17 to a gear 18, fast on the axle 20 of the reel 19. By reciprocating the rack-bar $b$, while the bell crank 7 has been depressed, the reel 19 is caused to rotate. By reason of the described connections between the reel and the rack-bar $b$, the reel 19 cannot reciprocate the latter. The finger-piece 8 of the bell crank 7 is provided with a ratchet face 10, in order that such bell crank, and therewith the clutch-lever 5, may be locked against the pull of the spring 12. It is convenient to lock the bell crank, when revolving the reel and winding up the line by reciprocating the rack-bar, as mentioned; and while the finger-piece is so locked, the reel 19 cannot be revolved reversely to unwind the line. In other words, the same mechanism that causes the reciprocation of the rack-bar $b$ to rotate the reel, after the bell crank 7 has been depressed, also locks the reel against any rotation, except through the medium of the rack-bar; for the reverse rotation of the reel, while the bell crank 7 is still locked down, would rotate the transmitting gear $w$, held in contact with the gear $t$, by the clutch member $v$, and in consequence the rotation of the gear $w$ would cause the rotation of the gear $t$, and with the latter the gear $s$; and since the gears $s$, $t$ are fast on their shafts $g$, $h$, the latter would be rotated in opposite directions inwardly, which would cause the pawls $o$, $p$ to lock with the rim-flange of the gears $i$, $j$, and start to rotate the latter in opposite directions, which motion the rack-bar $b$ would, however, not permit; and hence the reel 19 could not be rotated reversely so long as the finger-piece 8 is depressed. The same combination of devices also permits the operator to control the reel by the degree of pressure exerted on the finger-piece 8, for that would control the degree of frictional contact of the transmitting gear $w$ with the hub of the gear $t$; and thus the reel-operating devices constitute also a breaking mechanism by which may be controlled the reverse rotation of the reel in the paying out, or unwinding, of the line. This is an important feature, for by it the "running off" of the fish caught with the line is controlled, so that if it is a large fish it can be made to pull hard on the line, and more quickly tired out. It also prevents any noisy whirling around of the reel. In fact by my device the fisherman has complete control of the situation, for by the pressure he exerts on the finger-piece 8, he controls the running out of the line by the fish; and when the fish starts to come back the fisherman can quickly wind in the line by the reciprocation of the rack-bar $b$. I also provide automatic means for revolving the reel reversely, so as to pay out the line automatically, and such is accomplished by the following means: The reel spool 19 is loosely mounted on an axle-pin 20, the ends of which are riveted to the sides 21, 22 of the reel case, said sides being connected by rod 23. The reel case is fastened on the hollow handle, $a$, of the rod by any convenient means. A gear 24, loose on the reel axle 20, is provided on its outer face with a housing 25, within which is confined a spring 26, one of the ends of which is fastened to the housing 25, and the other to the axle 20. The gear 24 meshes with a pinion 27, integral with the gear 17, the latter being mounted on a stud 28 projecting from the reel case, and the gear 17 meshes with the pinion 16. The train of gears is so proportioned that the reel rotates at much greater speed than the spring unwinds, in order that a comparatively short spring 26 will be ample for a long fish line. And, as apparent, when the finger-piece 8 is not depressed, and in consequence the transmitting gear $w$ is a mere idler for the time, the spring 26 will act to rotate the reel 19 in unwinding direction, which unwinding may be controlled at will, as mentioned.

I claim:

1. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear to its axle, so as to rotate therewith; a gear on the axle of the reel; and connections between the last named gear and said transmitting gear.

2. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear by friction to its axle, so as to rotate therewith; a gear on the axle of the reel; and connections between the last named gear and said transmitting gear.

3. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear by friction to its axle, so as to rotate therewith; said clutch element including a finger piece and the devices being so arranged that the degree of depression of said finger-piece correspondingly controls the transmission gear; a spring controlling said clutch element and arranged to normally hold it in its inactive state; a gear on the axle of the reel; and connections between the last named gear and said transmitting gear.

4. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear to its axle, so as to rotate therewith to move said loose gear into contact with the secondary gear on the same axle, and so as to be rotated by the latter; said clutch element including a finger-piece and the devices being so arranged that the degree of depression of said finger-piece correspondingly controls the transmission gear; a spring controlling said clutch element and arranged to normally hold it in its inactive state; a gear on the axle of the reel; and connections between the last named gear and said transmitting gear.

5. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; each of said primary gears provided with a circumferential flange extending perpendicular from one face thereof, a disk rigidly mounted on the axle of said primary gear within said flange, and spring-controlled pawls pivoted to said disk, said pawls arranged to lock the shaft with said gear in one direction of the latter's rotation; a secondary pair of gears fast on the axles of said primary gears respectively, said secondary gears in mesh with each other; a transmitting gear loose on one of said axles; a clutch element adapted to connect said loose transmitting gear to its axle, so as to rotate therewith; a gear on the axle of the reel; and connections between the last named gear and said transmitting gear.

6. The combination with a fishing rod, of a line winding device, mounted thereon, comprising a reciprocable rack bar; a pair of transverse revoluble axles above the rack-bar; a pair of primary gears loose on said axles, said gears meshing with said rack-bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear by friction to its axle, so as to rotate therewith; said clutch element including a finger piece and the devices being so arranged that the degree of depression of said finger piece correspondingly controls the transmission gear; a spring controlling said clutch element and arranged to normally hold it in its inactive state; a gear on the axle of the reel; connections between the last named gear and said transmitting gear; and a spring arranged to rotate the said reel when released in unwinding direction.

7. The combination with a fishing rod provided with a hollow handle, of a rack-bar reciprocable in said hollow handle, said rack bar provided with a finger-piece projected through a slot of the hollow handle, a reel mounted on the rod, a pair of transverse axles rotatably mounted above said rack bar in said hollow handle; a pair of primary gears loose on said axles, said gears meshing with said rack bar, but out of mesh with each other; means on each of said primary gears adapted to alternately connect one thereof with its axle, so that the reciprocation of the rack bar will drive the axles of one of said primary gears alternately; a secondary pair of gears fast on the axles of said primary gears respectively, said secondary gears in mesh with each other; a transmitting gear loose on one of said axles; a clutch element adapted to connect said loose transmitting gear to its axle, so as to rotate therewith; a gear in the axle of the reel; and connections between the last named gear and said transmitting gear.

8. The combination with a fishing rod provided with a hollow handle, of a rack-bar reciprocable in said hollow handle, said rack bar provided with a finger-piece projected through a slot of the hollow handle, a reel mounted on the rod, a pair of transverse axles rotatably mounted above said rack bar in said hollow handle; a pair of primary gears loose on said axles, said gears meshing with said rack bar, but out of mesh with each other; each of said primary gears provided with a circumferential flange extending perpendicular from one face thereof, a disk rigidly mounted on the axle of said primary gear within said flange, and spring-controlled pawls pivoted to said disk, said pawls arranged to lock the shaft with said gear in one direction of the latter's rotation; a secondary pair of gears fast on the axles of said primary gears respectively, said secondary gears in mesh with each other; a transmitting gear loose on one of said axles; a clutch element adapted to connect said loose transmitting gear by friction to its axle, so as to rotate therewith; said clutch element including a finger piece and the devices being so arranged that the degree of depression of said finger piece correspondingly controls the transmission gear; a spring controlling said clutch element and arranged to normally hold it in its inactive state; a gear on the axle of the reel; connections between the last named gear and said transmitting gear; and a spring arranged to rotate the said reel when released in unwinding direction.

9. The combination with a fishing rod provided with a hollow handle, of a rack-bar reciprocable in said hollow handle, said rack bar provided with a finger-piece projected through a slot of the hollow handle, a reel mounted on the rod, a pair of transverse axles rotatably mounted above said rack bar in said hollow handle; a pair of primary gears loose on said axles, said gears meshing with said rack bar, but out of mesh with each other; each of said primary gears provided with a circumferential flange extending perpendicular from one face thereof, a disk rigidly mounted on the axle of said primary gear within said flange, and spring-controlled pawls pivoted to said disk, said pawls arranged to lock the shaft with said gear in one direction of the latter's rotation; a secondary pair of gears fast on the axles of said primary gear respectively, said secondary gears in mesh with each other; a transmitting gear loose on one of said axles; a clutch element adapted to move said loose gear into contact with the secondary gear on the same axle, and so as to be rotated by the latter; said clutch element including a finger piece and the devices being so arranged that the degree of depression of said finger piece correspondingly controls the transmission gear; a spring controlling said clutch element and arranged to normally hold it in its inactive state; a gear on the axle of the reel; connections between the last named gear and said transmitting gear; and a spring arranged to rotate the said reel when released in unwinding direction.

WILLIAM E. CONNIFF.

Witnesses:
T. J. GEISLER,
RALPH R. DUNIWAY.